Patented Mar. 21, 1944

2,344,553

UNITED STATES PATENT OFFICE 2,344,553

PROCESS FOR THE PRODUCTION OF META-TITANIC ACID

Eric C. Loth, Elizabeth, and Carlton S. Inscho, Livingston, N. J.

No Drawing. Application April 24, 1940,
Serial No. 331,420

11 Claims. (Cl. 23—202)

The object of our invention is to provide a simple and efficient process for the economical recovery of meta-titanic acid ($H_2TiO_3$) from titaniferous ores, such as ilmenite and rutile, which acid, when it is subsequently calcined in the usual manner results in a superior titanium dioxide ($TiO_2$) that is particularly useful as a paint pigment.

In commercial processes as heretofore practiced the production of $H_2TiO_3$ from titaniferous materials is as follows: The powdered ore in the presence of concentrated $H_2SO_4$ is digested in an open vessel in which the heating of the mixture is initiated by injecting thereinto a small amount of $H_2O$ or steam, or both, depending on the nature of the ore. This procedure causes local heating, whereupon the reaction starts and continues throughout the mass, simultaneously emitting copious corrosive acid fumes which must be disposed of. When the mass ceases to fume digestion is complete. Air or any other suitable gas is then blown into the water soluble digested mass to render it porous. The succeeding steps required to extract the $H_2TiO_3$ include dilution with water, clarification, and crystallization under vacuum where the iron is removed. Hydrolization is effected in an open vessel, following which are repeated washings, filterings and dewaterings. The $H_2TiO_3$ is then calcined to produce $TiO_2$.

According to our improved process the reaction of the ore and acid is effected more rapidly and efficiently than heretofore, and with no escape of fumes, and the subsequent treatment of the reaction product to obtain meta-titanic acid is accomplished in a simpler and more economical manner, as will be hereinafter described, the scope of the invention being expressed in the appended claims.

In carrying out our invention we digest powdered titaniferous ore, for example, ilmenite, with concentrated sulphuric acid ($H_2SO_4$) by heating the mixture at high temperatures, under pressure and agitation, for a suitable period, in a closed vessel capable of withstanding a pressure of from, say, 50 to 75 lbs. per square inch gauge. The quantity of acid employed is sufficient to combine with all the metallic elements in the ore contained in the vessel, and the mixture while under agitation therein is subjected to a temperature at which the reaction takes place, ranging from 150° to 325° F. The vessel which we prefer to employ is gas-tight and water-jacketed, the water between the spaced or jacketed walls of the vessel being heated until the desired pressure and temperature have been attained. We have accomplished efficient digesting of the contents of the vessel by heating the water until a pressure of 60 to 65 lbs., per square inch gauge, was reached, and continuing the heating for an hour or more. By introducing in the vessel during the digesting operation, zinc or other suitable metal, such, for example, as iron, the ferric compounds present will be reduced to ferrous.

The ore when treated as just described appears to become completely digested, forming a soft grayish mass which is readily soluble in water, with only a slight undissolved residue and without loss of any of the reaction product or acid to the atmosphere. We assume that the soluble portion of the digested mass consists of sulphates, mainly those of iron and titanium, and that the undissolved portion consists of insoluble sulphates and impurities.

As a result of the conducting the digestive procedure in the manner and under the conditions just described the reaction of the ore and acid takes place in the closed vessel more rapidly, efficiently and economically than formerly, there being no nuisance from escaping fumes, and no loss of materials by evaporation.

Following the step of digesting the contents of the closed vessel, under pressure, we add enough water to the mass to dissolve it and render it filterable. We then filter the solution and may reject the residue, which latter we find to be usually less than 1% of the original ore. To the filtrate, which is brown in appearance (and which, if made from ilmenite, may contain an amount of iron compounds equal to about 35% of the weight of the ilmenite treated), we add a solution of sodium chloride (NaCl) and water in sufficient quantity to change the brownish color of the filtrate to a light green. The resulting solution is then diluted with water to render the solution suitable for hydrolyzing. Hydrolysis is then effected, preferably in a closed water-jacketed vessel generally similar in construction to our digester hereinbefore referred to except that in the hydrolyzer employed the agitator is omitted and the inner vessel is lined with a non-ferrous acid resisting material. The water contained in the jacket of the hydrolyzer is heated to maintain the solution at a temperature of from 300° F. to 320° F. for about one hour or more, thus causing hydrolysis to take place under pressure.

We have discovered that the addition of sodium chloride to the slightly acid water solution of the reaction product prevents iron compounds and compounds of metals other than titanium from hydrolyzing, while allowing the titanium compounds to hydrolyze to the extent of about 95% of the titanium contained in the original ore. In other words the sodium chloride and water solution either acts as a catalyst or sets up complex chemical combinations which prevent the iron and other materials in the titaniferous solution from precipitating when hydrolyzing, except $H_2TiO_3$ which precipitates entirely, is substantially free from iron and is pure white in color.

When, in pursuance of this step of our invention, the titanium solution is heated above its atmospheric boiling point and under pressure in a closed vessel, hydrolysis of the solution is rapidly effected owing, in our opinion to the increased ionization of the water at elevated temperatures. In addition there is no loss of water by evaporation. Therefore, as compared with the atmospheric type of hydrolysis heretofore employed in the treatment of ilmenite and other titaniferous materials we are enabled to reduce the time required about 85% and the required quantity of water about 75%.

The hydrolysis of the titanium solution in the presence of a sodium chloride solution for the purpose mentioned may, if desired, be employed in a vessel open to the atmosphere, but in that case there will be required an increased quantity of water, owing to evaporation, and also a longer period of time for hydrolysis.

After hydrolysis and separation of the precipitate we wash the resulting product until it is free from all traces of the original solution, and then dewater. The meta-titanic acid ($H_2TiO_3$) thus obtained is practically pure white, but sometimes it contains traces of iron. To ensure a still purer product we may dissolve the white meta-titanic acid in concentrated sulphuric acid ($H_2SO_4$), obtaining an amber to brownish colored liquid, which liquid is treated with sodium chloride and water, diluted, and hydrolyzed as hereinbefore described. The resulting white meta-titanic acid is washed free of all traces of solution, and then is added a small amount of phosphoric acid ($H_3PO_4$) and potassium carbonate ($K_2CO_3$) to impart to the acid additional whiteness and softness. It is again thoroughly washed and dewatered. The resulting product is meta-titanic acid of exceptional purity, whiteness, fineness and softness, which product is entirely free from iron, and is particularly suitable for use as a paint pigment. This meta-titanic acid may be calcined, thus producing titanium dioxide ($TiO_2$) of superior quality, and of such fineness that no milling is required to prepare it for use as an efficient paint pigment.

We claim:

1. A method for recovering meta-titanic acid from ilmenite or other titaniferous ore, comprising digesting the ore with concentrated sulphuric acid in a closed vessel at temperatures above the atmospheric boiling point and under pressure, dissolving in water and filtering the digested mass, hydrolyzing the resulting titanium solution in the presence of sodium chloride and water, washing the then resulting product, dewatering the said product, dissolving the dewatered product in concentrated sulphuric acid, adding sodium chloride to and diluting the resulting liquid with water, and hydrolyzing the said liquid.

2. A method for recovering meta-titanic acid from ilmenite or other titaniferous ore, comprising digesting the ore with concentrated sulphuric acid in a closed vessel at temperatures above the atmospheric boiling point and under pressure, dissolving in water and filtering the digested mass, hydrolyzing the resulting titanium solution in the presence of sodium chloride and water, washing the then resulting product, dewatering the said product, dissolving the dewatered product in concentrated sulphuric acid, adding sodium chloride to and diluting the resulting liquid with water, hydrolyzing the said liquid, washing the product resulting from the latter hydrolysis, treating such product with phosphoric acid and potassium carbonate, and washing and dewatering the final product.

3. A method for recovering meta-titanic acid from ilmenite or other titaniferous ore, comprising digesting the ore with concentrated sulphuric acid in a closed vessel at temperatures above the atmospheric boiling point of the solution and under pressure, dissolving in water and filtering the digested mass, hydrolyzing the resulting titanium solution in the presence of sodium chloride and water in a closed vessel at temperatures above the atmospheric boiling point of the solution and under pressure, washing the then resulting product, dewatering said product, dissolving the dewatered product in concentrated sulphuric acid, adding sodium chloride to and diluting the resulting liquid with water, and hydrolyzing the said liquid in a closed vessel at temperatures above the atmospheric boiling point of the liquid and under pressure.

4. A method for recovering meta-titanic acid from ilmenite or other titaniferous ore, comprising digesting the ore with concentrated sulphuric acid in a closed vessel at temperatures above the atmospheric boiling point of the solution and under pressure, dissolving in water and filtering the digested mass, hydrolyzing the resulting titanium solution in the presence of sodium chloride in a closed vessel at temperatures above the atmospheric boiling point of the solution and under pressure, washing the resulting product, dewatering said product, dissolving the dewatered product in concentrated sulphuric acid, adding sodium chloride to and diluting the resulting liquid, hydrolyzing the said liquid in a closed vessel at temperatures above the atmospheric boiling point of the liquid and under pressure, washing the product resulting from the latter hydrolysis, treating such product with phosphoric acid and potassium carbonate, and washing and dewatering the final product.

5. In a method for recovering meta-titanic acid from ilmenite or other titaniferous ore, the steps which consist in introducing said ore and concentrated sulphuric acid into a closed gas-tight vessel, heating said vessel sufficiently to subject its contents to temperatures above the atmospheric boiling point and under pressure and continuing the heating until reaction takes place, dissolving in water and filtering the digested mass, hydrolyzing the resulting titanium solution in the presence of sodium chloride in a closed vessel at temperatures above the atmospheric boiling point of the solution and under pressure, washing the then resulting product, and dewatering the latter product.

6. In a method for recovering meta-titanic acid from ilmenite or other titaniferous ore, the step which consists in hydrolyzing the titanium sulphate content of a solution containing titanium and iron sulphates, in the presence of dissolved sodium chloride solution effective to prevent hydrolysis of the iron content in the titanium solution.

7. In a method for recovering meta-titanic acid from ilmenite or other titaniferous ore, the step which consists in hydrolyzing at temperatures above its atmospheric boiling point and under pressure the titanium sulphate in a solution also containing iron sulphate in solution, in the presence of dissolved sodium chloride.

8. In a method for recovering meta-titanic acid from ilmenite or other titaniferous ore, the steps which consist in hydrolyzing the titanium sulphate content of a solution containing titanium and iron sulphates, in the presence of a sodium chloride solution, and dissolving in sulphuric acid the product of hydrolysis.

9. In a method for recovering meta-titanic acid from ilmenite or other titaniferous ore, the steps which consist in hydrolyzing the titanium sulphate content of a solution containing titanium and iron sulphates in the presence of a sodium chloride solution, dissolving in sulphuric acid the product of hydrolysis, hydrolyzing the then resulting solution in the presence of a sodium chloride solution and washing the latter product of hydrolysis.

10. In a method of recovering meta-titanic acid from an acid ferruginous solution of titanium sulphate which solution is of a brownish color, the herein described steps which comprises adding sodium chloride to said solution in amount sufficient to cause the solution to change in color from brownish to light green, and thereafter subjecting the solution to hydrolysis while hot until the major part at least of the titanium is precipitated.

11. In a method of recovering meta-titanic acid from an acid ferruginous solution of titanium sulphate which solution is of a brownish color, the herein described process which comprise adding sodium chloride to said solution in amount sufficient to cause the solution to change in color from brownish to light green, and thereafter heating the solution, under superatmospheric pressure, to a temperature substantially above that at which it would boil under normal atmospheric pressure, and continuing said heat and pressure until the major part at least of the titanium is precipitated.

ERIC C. LOTH.
CARLTON S. INSCHO.

CERTIFICATE OF CORRECTION.

Patent No. 2,344,553. March 21, 1944.

ERIC C. LOTH, ET AL.

It is hereby certified that error appears in the printed specification of the above numbered patent requiring correction as follows: Page 1, second column, line 20, before "conducting" strike out the word "the"; page 3, second column, line 6, claim 10, for "comprises" read --comprise--; line 16, claim 11, for "process" read --steps--; and that the said Letters Patent should be read with this correction therein that the same may conform to the record of the case in the Patent Office.

Signed and sealed this 23rd day of May, A. D. 1944.

Leslie Frazer (Seal) Acting Commissioner of Patents.